No. 784,907. PATENTED MAR. 14, 1905.
C. C. WELSH.
CORN HUSKING APPARATUS.
APPLICATION FILED JULY 27, 1903.
3 SHEETS—SHEET 1.
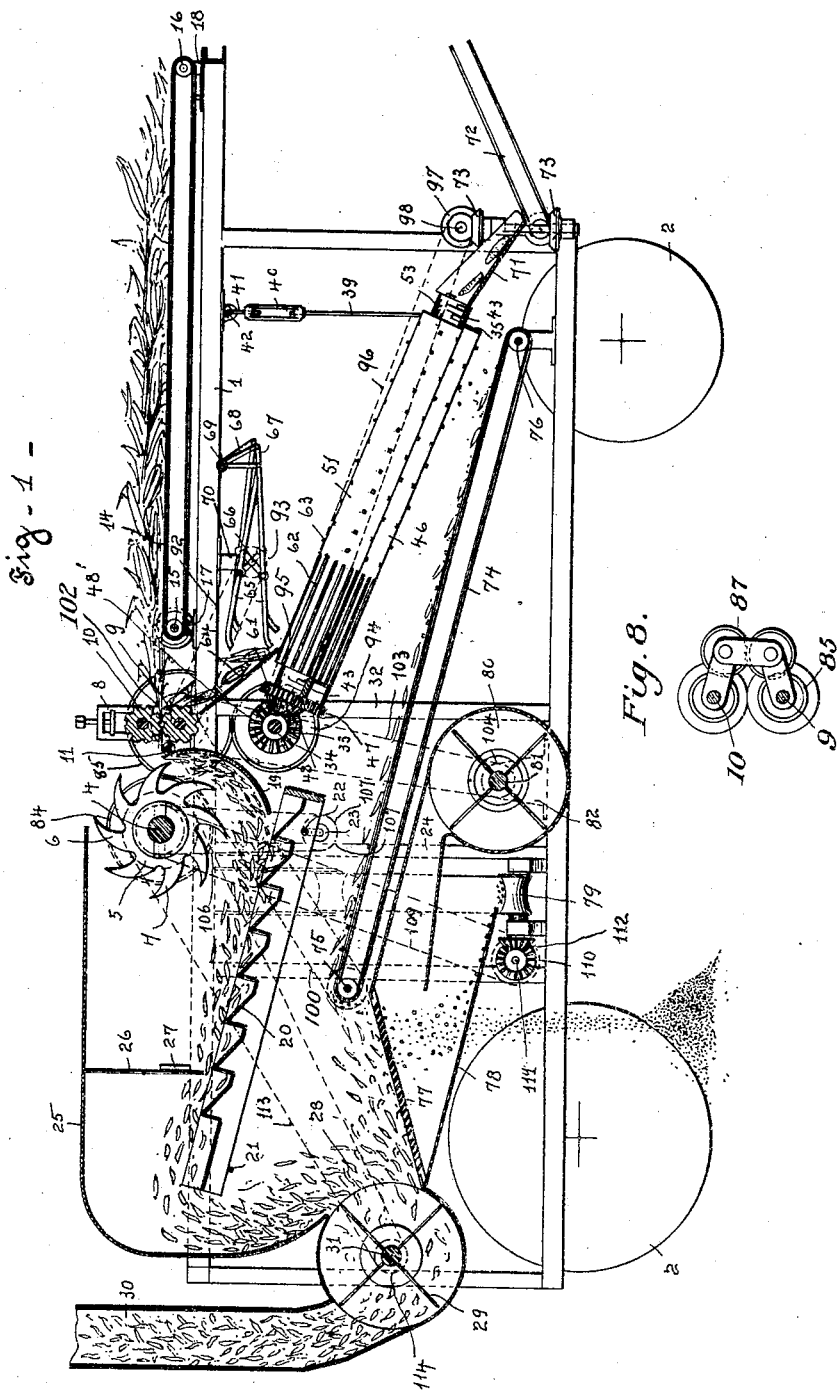
Witnesses
Grace Cowdrick
Eva M. Warren
Inventor
Charles C. Welsh
By Wilson & Martin
Attorneys

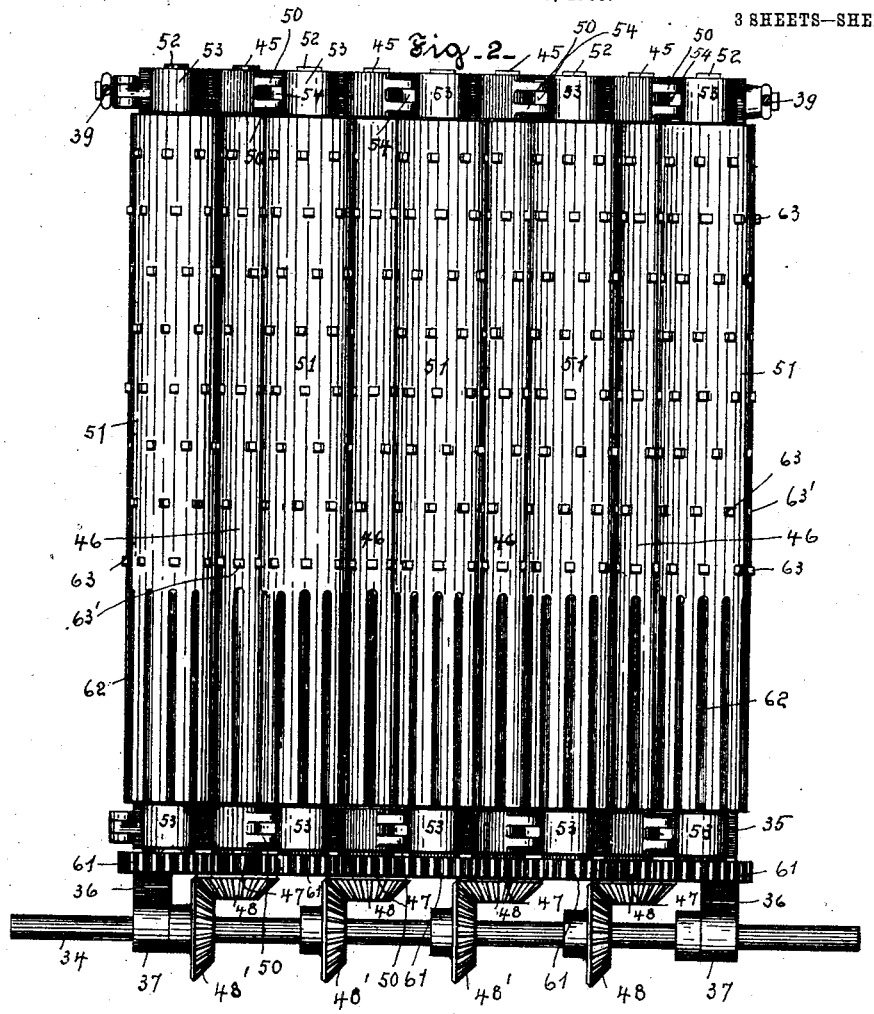

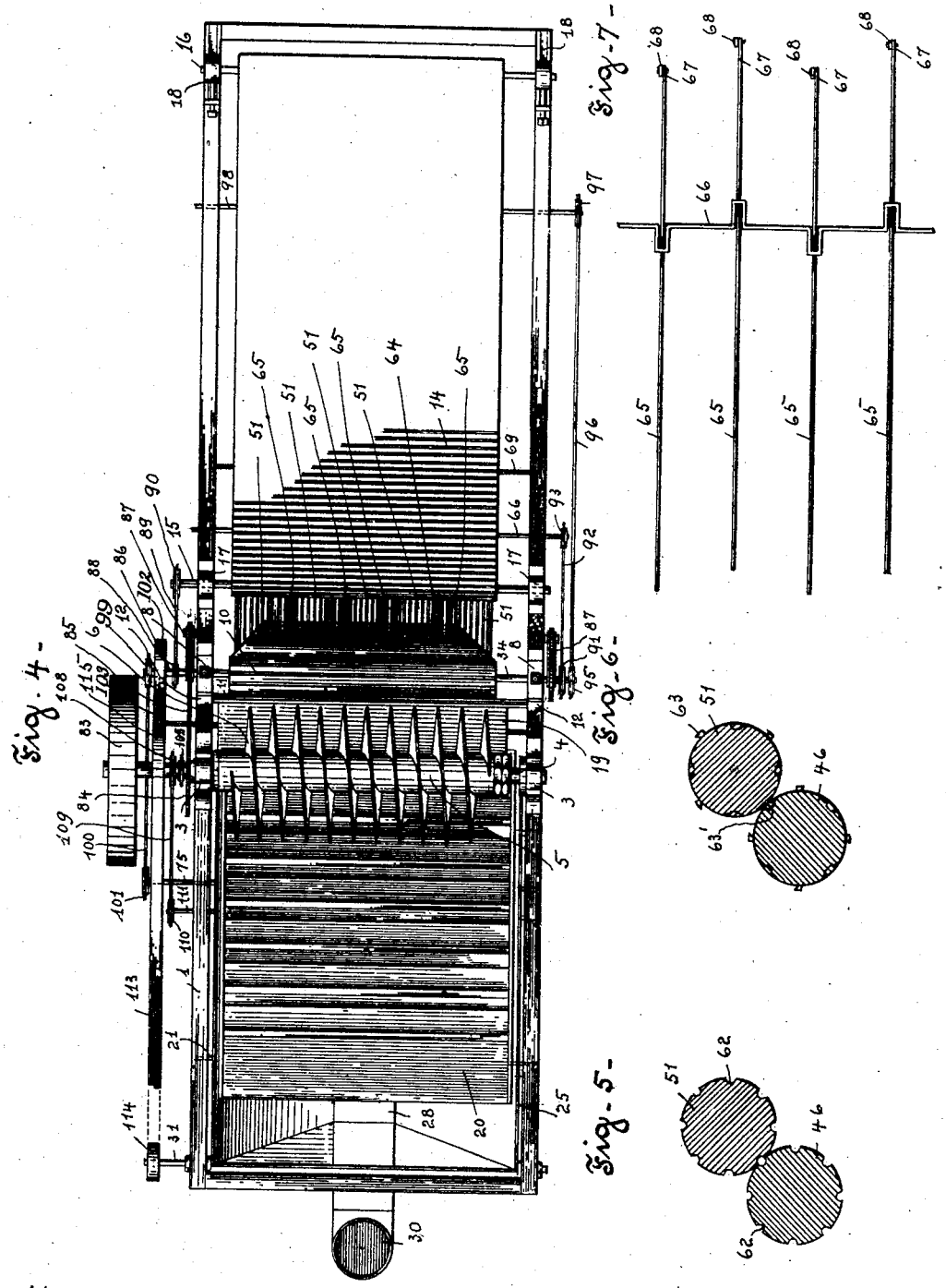

No. 784,907.

Patented March 14, 1905.

UNITED STATES PATENT OFFICE.

CHARLES C. WELSH, OF FOSTORIA, OHIO.

CORN-HUSKING APPARATUS.

SPECIFICATION forming part of Letters Patent No. 784,907, dated March 14, 1905.

Application filed July 27, 1903. Serial No. 167,127.

*To all whom it may concern:*

Be it known that I, CHARLES C. WELSH, a citizen of the United States, residing at Fostoria, in the county of Seneca and State of Ohio, have invented a new and useful Improvement in Corn-Husking Apparatus, of which the following is a specification.

My invention relates to corn-husking rollers used in combination with a mechanism adapted to detach ears of corn from the stalks and shred the stalks, and has for its object to provide a mechanism of the kind described with rollers that are adapted to readily remove the husks from the ears of corn without shelling the grains from the cob and, furthermore, that are adapted to allow pieces of cornstalks that may drop upon the rollers in the operation of snapping the ears of corn from the stalks to freely pass between the rollers.

The objects of my invention are accomplished as hereinafter described, and illustrated in the drawings, in which—

Figure 1 is a diagrammatic view of a fodder-shredder and corn-husker constructed in accordance with my invention. Fig. 2 is a top plan view of the husking-rollers. Fig. 3 is an end view of the bearings for the top rollers. Fig. 4 is a top plan view of the fodder-shredder and corn-husker. Fig. 5 is a cross-section through the fluted portions of companion husking-rollers. Fig. 6 is a cross-section through the husking portion of two companion rollers. Fig. 7 is a top plan view of the arms arranged to regulate the feed of corn-ears to the husking-rollers. Fig. 8 is a side elevation of the gear-train for driving the snapping-rollers.

The frame 1 of the corn-husker and fodder-shredder is mounted upon the traction-wheels 2, and upon opposite sides at the top of the frame are mounted bearings 3, in which the mandrel 4 of the shredder-head 5 is journaled.

The knife-blades 6 of the shredder-head are arranged in the form of a helix around the mandrel, and at suitable intervals the knife-blades are preferably in-cut to form semi-cresent teeth 7. In the bearings 8, also mounted on opposite sides of the top of the frame 1, are journaled the rollers 9 and 10, which are grooved lengthwise to readily snap the ears of corn from the stalks and feed the stalks to the shredder-head.

In the gap between the snapping-rollers and the shredder-head there is located a shaft 11, which is revolubly journaled in bearings 12, which are mounted to the sides of the bearings 8. The shaft 11 is fluted to form a rolling ledge over which the cornstalks are fed to the shredder-head.

The cornstalks are fed to the snapping-rollers by means of a belt 14, which is rove over the wheeled shafts 15 and 16. The shafts are journaled in the bearings 17 and 18, which are also mounted to the top of frame 1.

The apron 19 extends from the under side of the shaft 11 partly under the shredder-head to receive the shredded cornstalks and discharge the same on the serrated shoe 20, which inclines upward from the apron toward the rear of the frame 1. The rear end of the shoe is movably supported upon a cross-rod 21, which extends from side to side of the frame 1, and under the shredder-head of the shoe 20 is pivoted to a shaft 22, which is journaled in bearings 23, mounted to struts 24 of the frame 1. The shaft 22 is cranked between the sides of the frame 1 to actuate the shoe back and forth as well as up and down.

The shredder-head and the shoe are inclosed in a casing 25, and from the top of the casing a diaphragm 26 is pivotally suspended and arranged to swing toward the rear of frame 1. When the shoe is loaded with shredded cornstalks and is moved backward, the diaphragm will move with the shoe, and as the shoe is driven forward and raised the diaphragm will come to a stop 27 and strip the shredded cornstalks off the shoe, which drop into a hopper-like receiver 28, from which a fan 29 delivers them to a place of storage through the delivery-duct 30. The shaft 31 of the fan 29 is journaled in bearings attached to uprights of frame 1.

To the struts 32 of the frame 1 there are mounted bearings 33, in which is journaled a shaft 34, and between the struts there is mounted upon the shaft the roller-frame 35, from the head end of which bracket-arms 36 are extended. Each bracket-arm is provided at the free end with a boss 37, which is bored to receive the shaft, and thereby support the head end of the roller-frame. The tail end of the roller-frame is provided with trunnions 38, which extend opposite from the sides of the frame, and to each trunnion a hanger-rod 39 is coupled, the ends of which are threaded to engage with turnbuckles 40, each of which is provided with a hook-eye 41, arranged to engage a cross-rod 42, extending from side to side of the frame 1. The hanger-rods are made of a length to decline the roller-frame from the head end toward the tail end, and by providing the hanger-rod with a turnbuckle the angle of the decline may be suitably adjusted. Upon the top of the end plates 43 are formed semibearings 44, arranged to receive the journals 45 of the bottom rollers 46, and the journals at the head end of the frame are extended beyond the bearings to receive spur-wheels 47 and the miter-gear 48, which are rigidly mounted thereon. The top plates 49 for the semibearings are suitably bolted to the end plates of the roller-frame, and each top plate is provided with lugs 50, which extend radially from the top plates.

51 designates the top rollers, and from the end of each a shaft 52 is extended to journal in the bearings 53, and each bearing 53 is formed with a web 54, extending transversely from the bearings between the lugs 50 and are connected thereto by means of the pivot-pins 55. By forming lugs for the top plates of suitable length the top rollers are eccentrically disposed in relation to the bottom rollers and permit the top rollers to move from contact with the bottom rollers when a hard substance passes between the rollers.

To provide for an adjustable yielding contact of the top rollers with the bottom rollers, each web 54 is extended to pivotally couple with a rod 56, which is bifurcated at the head end to receive the web extensions, which is connected to the head by means of coupling-pins 57. The rods 56 extend through a suitable orifice 58, formed in the end plates of the roller-frame, and are threaded at the end to receive nuts 59, by means of which the springs 60, which are mounted upon the rods, are adjusted at the head end. The shaft of each top roller is provided with spur-wheel 61, adapted to intermesh with the spur-wheels 47 of their companion bottom rollers.

From the head end of the frame each roller is fluted a short distance downward to form grooves 62 to receive pieces of cornstalks or other hard substances and allow them to pass between the rollers without disturbing the contact of the rollers, and each roller is provided with a plurality of husking-pegs 63, which are arranged helically around the rollers from the end of the grooves to the tail end. The husking-pegs are arranged to enter into corresponding indents 63' in the opposite rollers. The pegs of one roller correspond with the indents of the contacting roller and alternate with its pegs, the pegs of each roller also alternating with its indents in spiral arrangement.

The bottom rollers receive motion from the driving-shaft 34 by means of miter-gears 48', mounted thereon and adapted to intermesh with the miter-gears 48, mounted upon the ends of the bottom rollers, and the top rollers are driven from the bottom rollers by the intermeshing spur-wheels 47 and 61.

The ears of corn which are snapped from the stalks by the rollers 9 and 10 drop upon an apron 64, which is declined to deliver the ears of corn upon the fluted ends of the husking-rollers, and any cornstalks carried with the ears are carried between the rollers by finding lodgment in the grooves formed therein. The opposite motion of upper and lower rollers bring the ears lengthwise in the pockets formed by each two top rollers and a bottom and tends to roll them from one top roller and draw them between the opposite top roller and the bottom roller. By reason of the inclination of the rollers the ears of corn gravitate toward the tail end of the rollers, and when they have passed the fluted portions of the rollers the husking-pegs strip the husks from the ears, the husks being drawn between the rollers as the ears pass along the rollers to the lower end of the roller-frame.

To regulate the delivering of the ears of corn to the husking-rollers, there is provided above and between the top rollers a series of arms 65, which are curved downward toward the delivery-apron. The regulating-arms are centrally of their length mounted upon a shaft 66, which is so cranked that each arm is moved reversely to the adjacent arm, and to permit the independent movement of the arms the ends 67 are coupled, by means of links 68, to a cross-rod 69. The cranked shaft is mounted in bearings 70, pendent from the top of frame 1.

From the tail end of the roller-frame an apron 71 is declined to deliver the husked ears of corn to a carrier 72, which is arranged to rotate in a horizontal plane and receives motion from the gearing 73. The detached husks and such grains of corn as may be shelled from the cob in the operation of husking drop upon a carrier 74, which is arranged in the form of a belt rove over the wheel-shafts 75 and 76, which are journaled in bearings attached to uprights of the frame.

The carrier 74 is arranged to deliver the husks and any corn that has been shelled from the ears by the husking-rollers into the hopper 28 upon a slatted screen 77, through which the shelled corn drops upon a foraminous fabric 78, from which the grains of corn are discharged upon a carrier 79, arranged to deliver the shelled corn into a suitable receptacle.

To readily separate the shelled corn from the husks, they are dropped together from the husk-carrier 74 through a current of air produced by the fan 80, which carries the husks into the hopper 28. The shaft 81 of the fan 80 is supported upon bearings 82, secured to the sides of the frame 1.

Motion is transmitted to the different mechanisms of the corn-husker and fodder-shredder by means of a belt (not shown) receiving its power from a suitable source and being rove over a driven pulley 83, which is mounted upon an extension of the shredder-head mandrel 4. Upon the mandrel extension there is also mounted a spur-wheel 84, which is arranged to intermesh with spur-wheel 85, mounted upon the shaft extension 86 of the bottom roller 9.

The top snapping-roller 10 is positively driven from the bottom roller 9 by means of a train of gears 87, which is arranged to intermesh with spur-wheel 85 and adapted to permit the top snapping-roller to separate from the bottom snapping-roller to allow for a varying feed of cornstalks.

Upon the shaft extension 86 of the bottom snapping-roller there is also mounted a sprocket-wheel 88, over which a sprocket-chain 89 is rove to transmit motion to the sprocket-wheel 90, mounted upon the driving-shaft 15 of the feed-belt. Upon the shaft 86 there is further mounted a sprocket-wheel 91, from which motion is transmitted, by means of a belt 92, to the sprocket-wheel 93, mounted upon the driving-shaft 66 for operating the regulating-arms.

Upon the shaft 34 there is mounted a spur-wheel 94, arranged to intermesh with the spur-wheel 85, and thereby transmit motion to the operating-shaft 34. Upon the operating-shaft 34 there is mounted a sprocket-wheel 95, from which motion is transmitted, by means of a chain 96, to the sprocket-wheel 97, mounted upon the shaft 98 to actuate the gearing 73 for operating the delivery-belt 72. Upon the shaft 86 there is further mounted a sprocket-wheel 99, over which a sprocket-chain 100 is rove to transmit motion to the sprocket-wheel 101, mounted upon the driving-shaft 75 of the husk-carrier, and by mounting a pulley 102 upon the shaft extension 86 motion is transmitted, by means of a belt 103, to a pulley 104, mounted upon the fan-shaft 81.

Upon the mandrel-shaft extension 4 there is mounted a sprocket-wheel 105, from which motion is transmitted, by means of a sprocket-chain 106, to the sprocket-wheel 107, mounted upon the shaft 22, arranged to operate the delivery-shoe, and upon the mandrel extension there is further mounted a sprocket-wheel 108, arranged to transmit motion by means of a sprocket-chain 109 to the sprocket-wheel 110, mounted upon the shaft 111, from which motion is transmitted, by means of gears 112, to the shelled-corn-delivering belt 79.

The delivery-fan 29 receives motion by means of a belt 113, which is rove over a pulley 114, mounted upon the fan-shaft 81, and a pulley 115, mounted upon the shredder-head mandrel 4.

Thus constructed and connected, the entire mechanism is set in motion by the power transmitted by the main belt to the driving-pulley 83, mounted on the shredder-head mandrel, the top of the feed-belt 14 being moved toward the snapping-rollers, the top of the lower feed-roller and the bottom of the upper feed-roller being revolved toward the shredder-head, and the top of the shredder-head being revolved toward the feed-rollers, the shredder-shoe being reciprocated, as described, the driving-shaft of the husking-rollers being also set in motion, thereby driving the bottom husking-rollers all in the same direction and the upper companion husking-rollers in the opposite direction, and also operating the regulating-arms of the husking-rollers. Motion is also oppositely communicated to the carrier-belts for the husked ears and the husks and at the same time to the fans. When thus in motion, cornstalks being placed on the feed-belt with the severed ends toward the snapping-rollers they are carried by the belt until the ends are in contact with the snapping-rollers and are thereby drawn between the snapping-rollers. In their passage between the snapping-rollers the ears being too large to pass between the rollers with the stalks are severed by the corrugations of the rollers and are dropped to an apron below, from which they slide by gravity into the pockets formed by the upper husking-rollers, as shown in Figs. 1, 2, and 3. As the stalks pass through the snapping-rollers the knives of the shredder-head shred the stalks, which drop from the shredder-head onto the apron below and slide from the apron onto the serrated shoe, by the reciprocating motion of which, together with the action of the pendulous diaphragm, the shredded stalks are delivered into the hopper of the delivery-chute, through which it is carried by the air-blast produced by the delivery-fan. As the severed ears of corn drop upon the apron of the husking-rollers the regulating-arms operate to direct them into the several pockets formed between the upper husking-rollers onto the lower husking-rollers, together with any pieces of severed stalk that may be carried with the ears. The ears are thus brought into contact with the fluted portions of the rollers, which operate to separate any pieces of stalk therefrom and carry them between the rollers and deposit them on the husk-carrier below, the opposite motion of the lower rollers and their companion upper rollers being adapted to roll the ears away from one side of the pockets toward the line of contact of the indrawing upper and lower companion rollers without allowing them to pass between. The inclination of the rollers causes the ears (which by the operation of the rollers and the regulating-arms are deposited lengthwise on the lower rollers) to gravitate toward the lower portions of the rollers, where the husks of the ears are caught by the husking-pegs of the rollers and drawn inward between the rollers and forcibly severed from the ears. The spiral disposition of the pegs and the revolving motion of the ears assist the gravitation, and by the time the ear has reached the lower end of the rollers the husks have been entirely stripped from the ears, carried between the rollers, and dropped onto the ear-carrier. In this process of husking occasional grains of corn will be loosened from the ear and will pass through the rollers with the husks onto the husking-belt and will be carried by the belt with the husks and dropped onto a separating-screen in front of the separating air-fan. The grains being heavier and smaller will pass through the screens, and the husks and the pieces of stalks carried by the husk-belt will be blown by the blast from the fan along with the shredded cornstalks through the delivery-chute and deposited thereby, the screened grain drops onto the grain-carrier, which deposits it into sack or other receptacle. (Not shown.)

Frequently corn is brought to the husker from the shock in the field when the husks of the ears are damp. In this condition at the same inclination of the husking-rollers the ears gravitate more slowly down the rollers than when they are dry, and therefore different conditions of the corn-husks require different inclinations of the husking-rollers in order that the ears may be retained on the rollers only a sufficient length of time to husk them clean. Ears remaining on the rollers after the husks are removed result in more or less shelling of the grain from the cob. By constructing the husking-rollers as described I have provided a ready means of adjusting the inclination of the rollers to suit the condition of the corn that is being husked, and thereby secure clean husking of the ears without shelling.

By fluting the upper ends of the rollers I also secure the separation from the ears of pieces of the stalks that would otherwise be carried along with the ears and deposited on the ear-carrier.

By the arrangement of upper and lower husking-rollers shown and described forming pockets for the ears, with the upper rollers yieldingly held in contact with the lower rollers and having opposite motion thereto, I have provided an efficient means of retaining the ears in position for the operation of the husking-pegs without undue pressure on the ears and for the husks to be drawn between the rollers without the ears being jammed and the grain shelled therefrom.

What I claim to be new is—

1. In a corn-husker, the combination with a lower husking-roller, of two upper husking-rollers held yieldingly in lengthwise contact with the lower roller, in parallel relation, on opposite sides of the vertical plane of its axis, and means to revolve the rollers, the upper rollers in opposite direction from the lower.

2. In a corn-husker, the combination of a series of lower husking-rollers, in parallel lengthwise inclined position with intervals between the rollers, a series of upper husking-rollers so arranged above the lower rollers that each lower roller is in parallel lengthwise contact with two of the upper rollers on opposite sides of the vertical plane of its axis, and each intermediate upper roller is in contact lengthwise with two lower rollers and bridges the interval between them and means to revolve the rollers, the lower series of rollers all in one direction and the upper series of rollers all in the opposite direction.

3. In a corn-husker, the combination with a body-frame of snapping-rollers journaled in the body-frame, a driving-shaft mounted in bearings secured to the body-frame below the snapping-rollers, a husking-roller frame, bearings on one end of the roller-frame pivotally mounting one end of the frame on the shaft, means to suspend the opposite end of the husking-roller frame and adjustably decline the frame from the shaft, lower husking-rollers journaled parallel at intervals in the ends of the roller-frame, upper husking-rollers above the lower husking-rollers and contacting therewith on opposite sides of the vertical planes of their axes, journal-bearings for the upper rollers having arms pivotally secured to the ends of the roller-frame, intermeshing spur-gears mounted concentric on the upper and lower rollers, intermeshing miter-gears mounted on the driving-shaft and on the upper end journals of the lower rollers adapted to revolve all the lower rollers in the same direction, means to yieldingly hold the upper rollers in contact with the lower rollers, complementary means on the upper and lower rollers to engage the husks of ears of corn deposited on the rollers, and means to revolve the snapping-rollers and the driving-shaft of the husking-roller frame, substantially as set forth.

In witness whereof I have hereunto set my hand, this 15th day of June, A. D. 1903.

CHARLES C. WELSH.

Witnesses:
  H. E. BRADUER,
  JOHN R. BRADUER.